June 5, 1951  E. G. D. GABBEY  2,555,964
GAUGE FOR MEASURING OR CHECKING THE EFFECTIVE
DIAMETERS OF SCREW THREADS
Filed July 17, 1946  2 Sheets-Sheet 1

INVENTOR
ERIC GORDON DOUGLAS GABBEY
BY
Haseltine, Lake & Co.
ATTORNEYS.

June 5, 1951     E. G. D. GABBEY     2,555,964
GAUGE FOR MEASURING OR CHECKING THE EFFECTIVE
DIAMETERS OF SCREW THREADS
Filed July 17, 1946     2 Sheets-Sheet 2
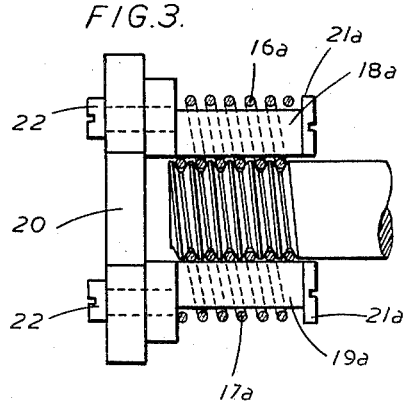
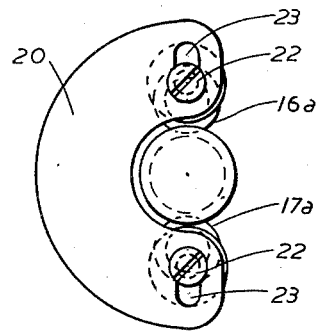
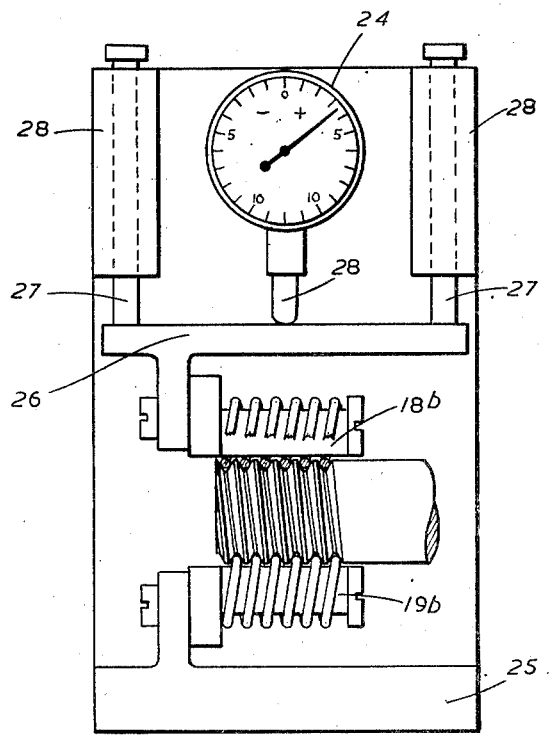
INVENTOR
ERIC G.D. GABBEY
By Haseltine, Lake & Co.
AGENTS Patented June 5, 1951

2,555,964

UNITED STATES PATENT OFFICE 2,555,964

GAUGE FOR MEASURING OR CHECKING THE EFFECTIVE DIAMETERS OF SCREW THREADS

Eric Gordon Douglas Gabbey, Edgware, England

Application July 17, 1946, Serial No. 684,328
In Great Britain October 25, 1943

4 Claims. (Cl. 33—199)

This is a continuation-in-part of my copending application Serial No. 547,557, filed August 1, 1944, now Patent No. 2,443,820.

This invention relates to gauges for checking the simple effective diameter of screw threads as opposed to the full diameter thereof, and when the term diameter is used hereinafter in connection with a screw thread to be checked it will be intended to mean the simple effective diameter unless otherwise specified.

The simple effective diameter of a screw thread is defined as the length of a line drawn at right angles to and through the axis of the screw, measured between the points where the line cuts the flanks of the thread, whereas the full diameter is defined as twice the maximum radius of the screw thread measured at right angles to the axis.

The present invention can be regarded as being based upon what is known as the three wire method of measurement which is used extensively in tool room work for measuring or checking the diameters of screw threads, two straight wires or cylinders of circular cross section and of known diameter being placed in contact with a screw thread on one side and a third similar wire or cylinder being placed substantially diametrically opposite the said two wires, in contact with the other side of the thread, the three wires or cylinders being of such diameter as to touch the thread at points which are on the simple effective diameter thereof and also to extend beyond the full diameter of the thread, measurements being taken with a micrometer over the tops of the three wires or cylinders and the simple effective diameter being arrived at by calculation.

In the present invention the screw thread engaging means by which the diameter of a screw thread is checked comprises two spaced helical coils of wire, adapted to receive between them the screw thread to be checked and to engage the latter at diametrically spaced positions around the thread, the successive turns of each coil being adapted to engage the diameters of the successive turns of the thread being checked, the space between the said two wire coils being predetermined before the gauge is used and the wire coils being adapted for independent movement whereby the successive turns thereof may be aligned with the successive turns of the thread being checked. Thus the springs can move axially or rotatively independently of one another and the coils of each spring can move relatively to one another to accommodate the thread of the screw being checked.

In order that the nature of the invention and the method of carrying same into effect may be more thoroughly understood, certain embodiments of the same will now be described with reference to the accompanying drawings in which:

Figure 3 is a side elevation, with parts shown in section, of another form of screw gauge in accordance with the invention.

Figure 4 is an end view of the screw gauge shown in Figure 3.

Figure 5 is a front view of a screw gauge in accordance with the invention when used in conjunction with a dial gauge.

Figure 1:
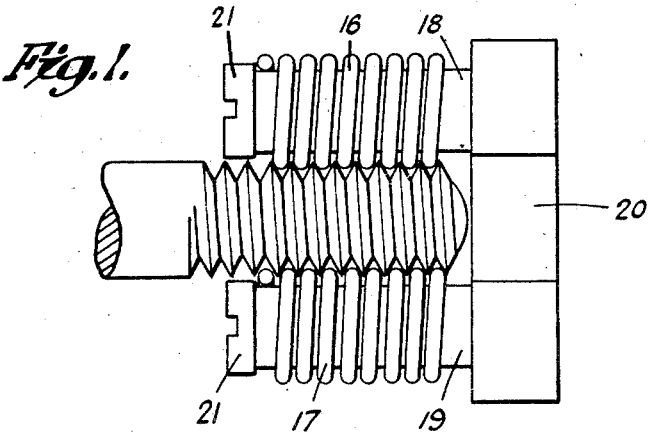
Figure 1 is a side elevation of one form of screw gauge in accordance with the invention.
Figure 2:
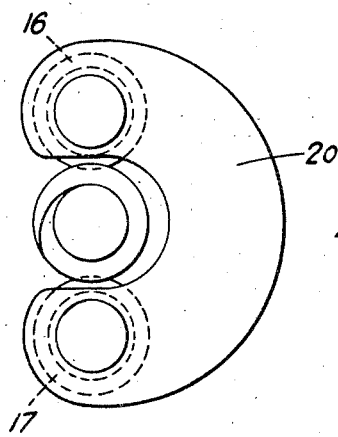
Figure 2 is an end view of the screw gauge shown in Figure 1.

Referring to Figures 1 and 2 of the drawings it will be seen that the gauge is adapted to be used somewhat as a caliper gauge i. e. with diametrically opposed point contact with a screw thread, and consists of two identical convolutions of helical coils of wire 16 and 17, such wire being of constant diameter and the convolutions or coils being supported loosely (as will be explained in more detail hereinafter) or two parallel spaced cylindrical pins or studs 18 and 19 respectively, such studs being fixed at one end in a common bridge member 20 which is of U or substantially half annular form so as to leave an uninterrupted space between the two coils 16 and 17 to receive a screw thread the diameter of which is to be checked.

The pins or studs 18 and 19 are each hardened and ground, and rigidly fixed, e. g. spigot fitted, in the bridge member at the appropriate end, the other end of each pin or stud being formed with an abutment 21 to prevent the convolution or coil mounted thereon from escaping from the pin. Such abutment can, as shown, comprise a cylindrical head of external diameter greater than the internal diameter and smaller than the external diameter of the convolutions or coils so that it does not interfere with the reception of a screw thread between the convolutions or coils.

The convolutions or coils 16 and 17 are wound in the opposite direction to the turns of the threads to be checked and they are free to rotate and to move slightly axially and laterally with respect to the pins or studs 18 and 19 on which they are mounted so that the successive turns of the convolutions or coils may be aligned with the successive turns of a screw thread being checked.

The initial setting of the two parallel pins or studs 18 and 19 with the convolutions or coils 16 and 17 mounted thereon is effected by means of reference blocks (known commonly as "slips") or a master block, the convolutions or coils being fully pressed apart against the restraining influence of the pins or studs, in which position individual turns of the convolutions or coils can be likened to the wires or cylinders of the three wire method above referred to.

In checking, for example, the simple effective diameter of a screw thread it is desired to know whether such thread falls within certain maximum and minimum limits. Two gauges of the kind above described can be used, such gauges being correspondingly set according to the required limits.

If the screw thread will pass the maximum gauge it is not oversize and if it will not pass the minimum gauge it is not undersize. Likewise if the thread does not pass the maximum gauge it is oversize or if it passes the minimum gauge it is undersize.

The gauge shown in Figures 3 and 4 of the drawings is similar to that already described, but the pins or studs 18a and 19a are in this case adjustable to enable a single gauge to be used for checking the diameters of screw threads of varying sizes. The pins or studs 18a and 19a are adjustably secured by locking screws 22 passing through slots 23 in the bridge member 20, thus allowing the distance between the pins or studs 18a and 19a and therefore between the convolutions or coils 16a and 17a to be varied at will. The abutments 21a, provided to prevent the convolutions or coils escaping from the pins or studs, are eccentrically disposed with respect to the pins or studs so that they will not interfere with the reception of a screw thread between the convolutions or coils.

The gauge shown in Figure 5 is mounted for use in conjunction with a dial gauge 24. One pin or stud 19b is rigidly fixed to the stand 25 of the dial gauge. The other pin or stud 18b is provided with an extension 26 to the ends of which are secured rods 27 slidably mounted in sleeve-shaped brackets 28 carried by the stand 25 of the dial gauge. The extension 26 is arranged at all times to abut against the shaft 28 of the dial gauge, which is spring influenced so that the movable pin or stud 18b is always urged towards the fixed pin or stud 19b.

In using a gauge in conjunction with a dial gauge as described a slip or master block is first inserted between the pins or studs 18b and 19b and the dial set to zero. The slip or master block is removed and a screw thread, the diameter of which it is desired to check is inserted in the gauge. Any deviation above or below the correct measurement can be read from the dial.

I claim:

1. A gauge device for checking the simple effective diameter of screw threads and constructed for operation on the three wire principle of screw gauging, comprising two spaced helical coils of wire for engaging a screw thread to be checked at diametrically opposite points and on the simple effective diameter thereof, such wire being of constant diameter, and means for supporting said helical coils of wire in predetermined parallel spaced relationship, said coils being adapted for axial and rotary movement with respect to the said supporting means.

2. A gauge device for checking the simple effective diameter of screw threads and constructed for operation on the three wire principle of screw gauging, comprising two spaced helical coils of wire for engaging a screw thread to be checked at diametrically opposite points and on the simple effective diameter thereof, such wire being of constant diameter, and means for supporting said helical coils of wire comprising two cylindrical pins upon each of which one of said coils is co-axially mounted for axial and rotary movement with respect thereto, and a bridge member for holding said cylindrical pins and the helical coils supported thereby in fixed parallel spaced relationship.

3. A gauge device for checking the simple effective diameter of screw threads and constructed for operation on the three wire principle of screw gauging, comprising two spaced helical coils of wire for engaging a screw thread to be checked at diametrically opposite points and on the simple effective diameter thereof, such wire being of constant diameter, and means for supporting said helical coils of wire in parallel spaced relationship, said supporting means comprising two cylindrical pins upon each of which one of said coils is co-axially mounted for axial and rotary movement with respect thereto, a bridge member for holding said cylindrical pins in parallel spaced relationship and adjustment means for varying the spacing of said cylindrical pins.

4. A gauge device for checking the simple effective diameter of screw threads and constructed for operation on the three wire principle of screw gauging, comprising two spaced parallel helical coils of wire for engaging a screw thread to be checked at diametrically opposite points and on the simple effective diameter thereof, such wire being of constant diameter; means for supporting said helical coils of wire comprising two cylindrical pins upon each of which one of said coils is co-axially mounted for axial and rotary movement with respect thereto, one of said pins being mounted for movement with respect to the other pin in a plane at right angles to the longitudinal axis thereof, and spring means for urging said movable pin towards the other pin so that by applying a standard measuring device to said pins thereby to measure variations in the relative spacing of the pins, the variation of the simple effective diameter of a screw thread from a selected standard diameter may be determined.

ERIC GORDON DOUGLAS GABBEY.

REFERENCES CITED

The following references are of record in the file of this patent:

UNITED STATES PATENTS

| Number | Name | Date |
| --- | --- | --- |
| 1,423,339 | Ledell | July 18, 1922 |
| 1,875,726 | Hartness | Sept. 6, 1932 |
| 1,925,346 | Summers | Sept. 5, 1932 |
| 2,308,011 | Johnson | Jan. 12, 1943 |
| 2,443,820 | Gabbey | June 22, 1948 |

FOREIGN PATENTS

| Number | Country | Date |
| --- | --- | --- |
| 107,855 | Great Britain | July 19, 1917 |
| 214,081 | Great Britain | Apr. 17, 1924 |
| 257,498 | Germany | Mar. 8, 1913 |
| 577,541 | Great Britain | May 22, 1946 |
| 598,911 | Germany | June 21, 1937 |